United States Patent [19]
Tatara et al.

[11] 4,145,306
[45] Mar. 20, 1979

[54] CALCIUM HYPOCHLORITE COMPOSITION

[75] Inventors: Seiji Tatara, Tokyo; Yoshiki Domori, Niigata; Masashi Kumoda, Joetsu; Yusuke Endo, Nakago, all of Japan

[73] Assignee: Nippon Soda Company Limited, Tokyo, Japan

[21] Appl. No.: 774,948

[22] Filed: Mar. 7, 1977

[30] Foreign Application Priority Data

Mar. 25, 1976 [JP] Japan .................................. 51-31953

[51] Int. Cl.$^2$ ............................................... C09K 3/00
[52] U.S. Cl. ............................. 252/187 H; 423/474
[58] Field of Search .................. 252/187 H; 423/265, 423/266, 474; 34/9

[56] References Cited

U.S. PATENT DOCUMENTS 3,645,005  2/1972  Dychdala et al. ............... 423/474 X Primary Examiner—Benjamin R. Padgett
Assistant Examiner—J. L. Barr
Attorney, Agent, or Firm—George B. Oujevolk

[57] ABSTRACT

A granular, heterogeneous calcium hypochlorite composition comprising a mixture of a substantially anhydrated granular component and a hydrated granular component keeping the crystallization water of from 2 to 3 moles water per mole of $Ca(OCl)_2$ in the form of $Ca(OCl)_2 \cdot 3H_2O$ has an improved stability and safety, and said composition is suitable for preparing break-resistant, good-dissoluble calcium hypochlorite tablets.

8 Claims, 4 Drawing Figures

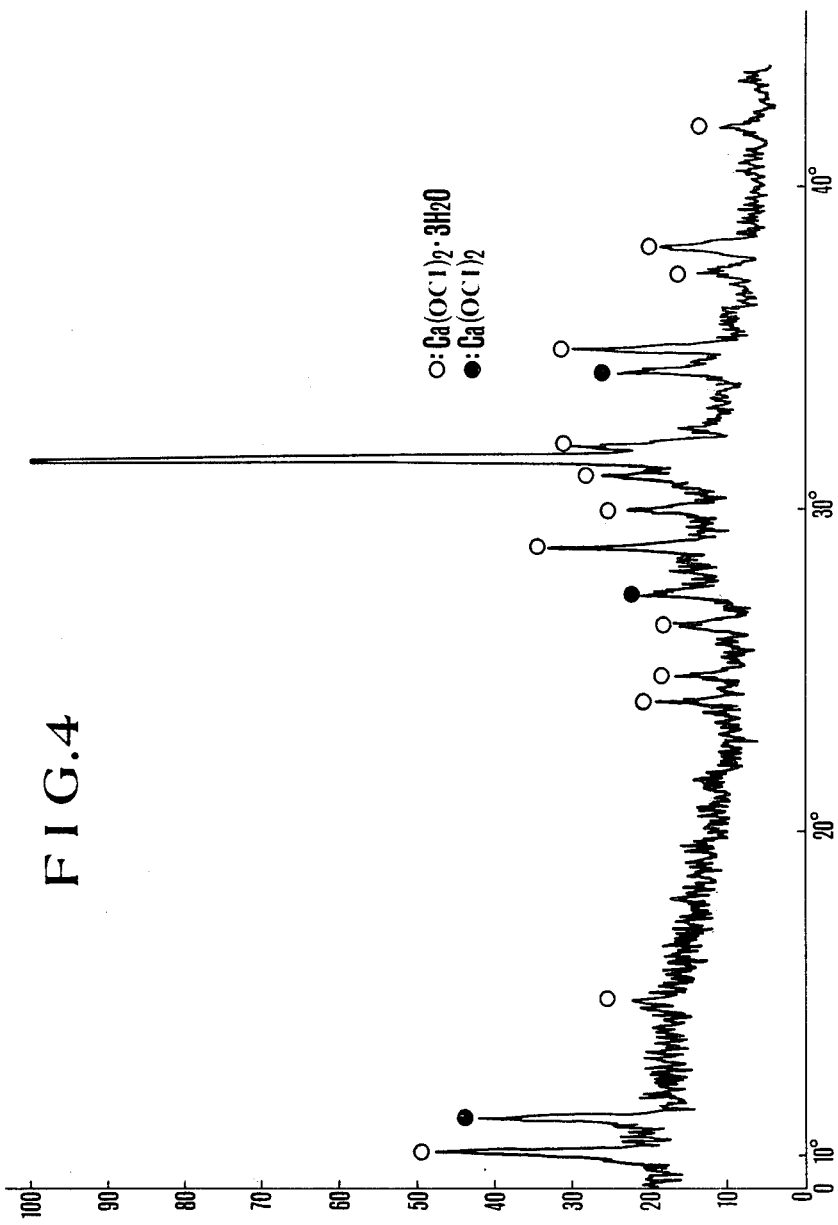

CALCIUM HYPOCHLORITE COMPOSITION

BACKGROUND OF THE INVENTION

This invention relates to an improved calcium hypochlorite composition and, more particularly, this invention concerns a calcium hypochlorite composition having an improved storage stability and the safety, i.e., which resists to spontaneous decomposition and self-propagating decomposition.

BRIEF DESCRIPTION OF THE PRIOR ART

It is said that calcium hypochlorite compositions which are commercially handled as the high-grade calcium hypochlorite composition generally contain about 65 to 75% of calcium hypochlorite [$Ca(OCl)_2$], about 15 to 20% of chlorides and about 5 to 7% of alkalis, and the water content is generally less than 2%. The composition decomposes when it is subjected to heating or contacted with organic materials of easily oxidized nature, and the decomposition is exothermic and proceeds rapidly. Even under normal storage conditions of ambient temperatures, calcium hypochlorite in the composition decomposes gradually and will lose 3 to 5% of the available chlorine content in a year.

Several processes have been proposed for making the calcium hypochlorite composition safe, and one of the most promising means is said to make hold a proper amount of water in the composition.

One process (U.S. Pat. No. 3,645,005) teaches a composition containing 6 to 15% of water for a calcium hypochlorite composition that is resistant to self-propagating decomposition with the storage stability comparable with that of substantially dry compositions.

Another process (Japanese Kokai 75-70297) teaches the water content of 16 to 22% for a composition having an excellent safety.

In so far as safety of the composition is concerned, these teachings can facilitate the object of making it safer, however, the storage stability of the former is not entirely satisfactory as shown in Test 1, and the latter composition has a difficulty in obtaining a composition of high available chlorine content.

OBJECT OF THE INVENTION

It is the object of this invention to provide a calcium hypochlorite composition resisting to the self-propagating decomposition and having an improved storage stability of as stable as a substantially anhydrated calcium hypochlorite composition.

Another object of this invention is to provide a calcium hypochlorite composition containing a high available chlorine.

Other objects and advantages of this invention will further become apparent hereinafter.

BRIEF DESCRIPTION OF THE DRAWING

FIG. 2, FIG. 3 and FIG. 4 show X-ray diffraction diagrams of calcium hypochlorite compositions.

DETAILED DESCRIPTION

The present invention is a calcium hypochlorite composition composed of a heterogeneous mixture of a hydrated granular calcium hypochlorite composition and an anhydrated granular calcium hypochlorite composition, which has an excellent storage stability and safety.

The configurations of the hydrated component and the anhydrated component are preferably granular composed of particles ranging from 8 to 100 mesh.

Said hydrated component is a calcium hypochlorite composition having the available chlorine of at least 50%, and the water kept in the composition is all crystallization water to form $Ca(OCl)_2.3H_2O$. The amount of said crystallization water is calculated to be from 2 to 3 moles per mole of $Ca(OCl)_2$, and the active ingredient is completely crystallines of $Ca(OCl)_2.3H_2O$ or crystallines of $Ca(OCl)_2.3H_2O$ partially accompanied with crystallines of $Ca(OCl)_2$.

Figure 2:
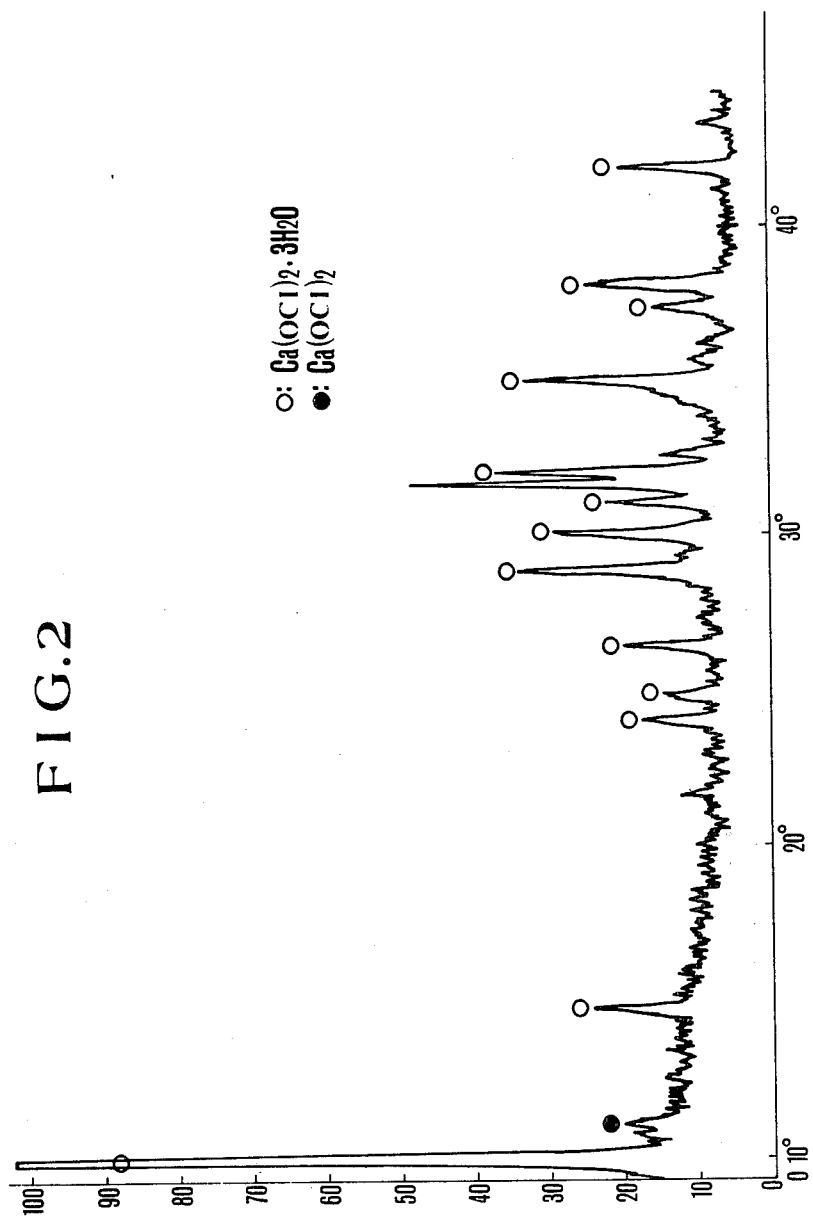

Said hydrated component is characterized structurally by comparing the X-ray diffraction diagrams as follows:

FIG. 2 (diagram of a hydrated calcium hypochlorite composition of the present invention) indicates the existence of $Ca(OCl)_2.3H_2O$ mainly.

Figure 3:
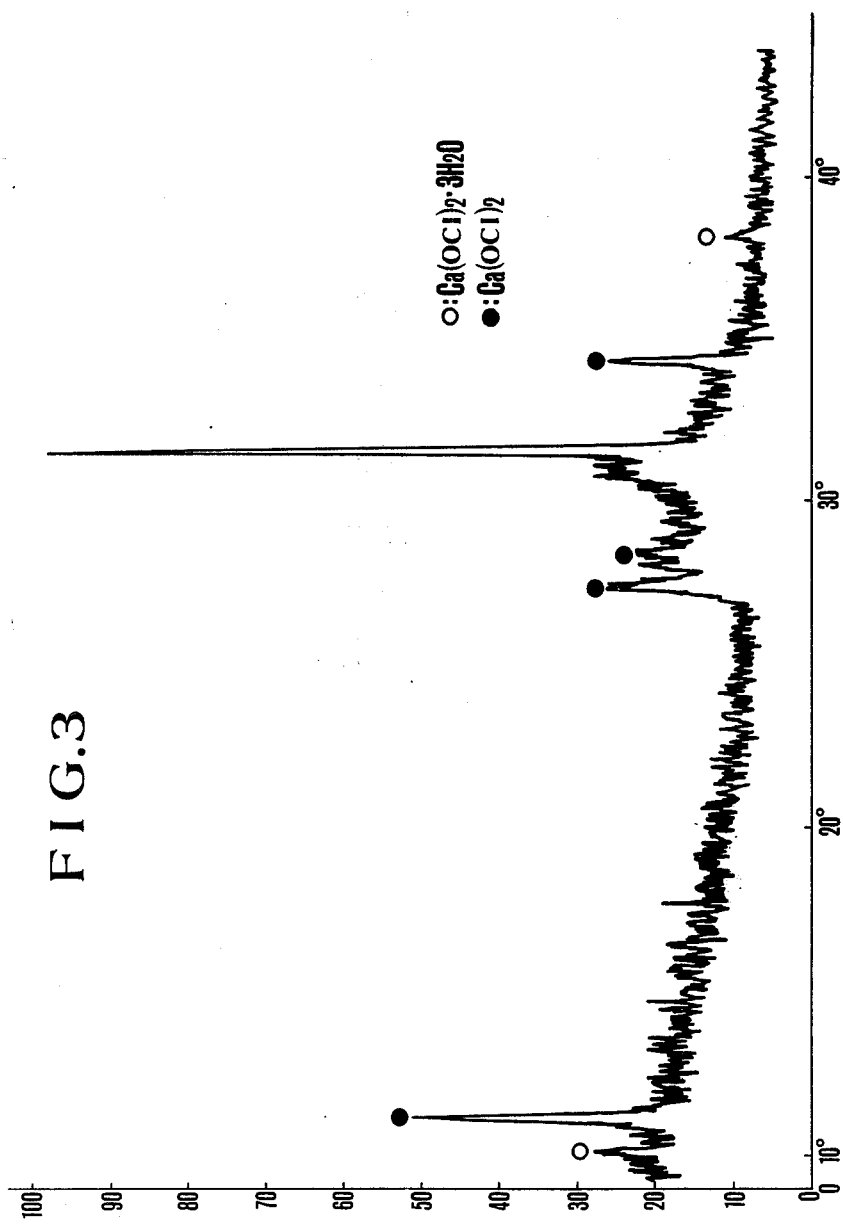

FIG. 3 (diagram of an anhydrated calcium hypochlorite composition) indicates existence of $Ca(OCl)_2$ mainly.

FIG. 4 (diagram of a hydrated calcium hypochlorite composition prepared by the prior art and containing 6% of water) indicates the coexistence of $Ca(OCl)_2.3H_2O$ and $Ca(OCl)_2$ intermediately.

The hydrated component is preferably obtained at an early step of the drying process of wet neutral calcium hypochlorite crystals which are separated from a slurry of chlorinated mixture in commercial production of the high-grade calcium hypochlorite.

Said anhydrated component is a calcium hypochlorite composition which is available as commercial high-grade calcium hypochlorite compositions containing about 65–75% of available chlorine and less than 2% of crystalization water.

The objective of the invention can be achieved based on a discovery that said anhydrated component which is satisfactorily stable but regretfully unsafe can be improved in its defect of the safety when it is combined properly with said hydrated component which is not only surprisingly resistant to the self-propagating decomposition but also fairly stable at ordinary temperatures.

The proportion of the hydrated component to the anhydrated component varies in accordance with properties of the hydrated component, and is settled in consideration of the safety of the blended composition. Blending of 0.3 parts by weight or more of the hydrated component with 1 part of the anhydrated component provides a safe composition prevented from the self-propagating decomposition, as exhibited in Test 2. A hydrated component keeping an amount of said crystallization water corresponding to nearly 3 moles per mole of $Ca(OCl)_2$ is preferably employed for providing most efficiently the component with the safety property, however, such easily obtainable hydrated components as keeping an amount of said crystallization water corresponding to 3.0 - 2.5 moles per mole of $Ca(OCl)_2$ are also employed.

The blending of the components is conducted by means of such conventional mixing apparatus as ribbon blenders and flash mixers.

The fact that the water kept in the hydrated component of a composition of the present invention does not transfer to the anhydrated component, as shown in Test 3, makes the composition to be a heterogeneous mixture of two different granular components.

The composition of the invention is fortified in its available chlorine content to more than about 55% and has the safety property of resistant to self-propagating decomposition, and is superior to compositions prepared by the prior art in respect to its storage stability.

The present composition is composed of the specific hydrated calcium hypochlorite composition and the anhydrated calcium hypochlorite composition both of which generate during their spontaneous decomposition smaller amount of chlorine gas than usual hydrated calcium hypochlorite composotions, and the amount of chlorine gas generated from the present composition is also smaller than that from compositions prepared by the prior art. The fact shows merits in corrosion of metallic containers for the calcium hypochlorite composition.

A further independent advantage of the invention concerns calcium hypochlorite composition tablets of improved properties. Since the composition is composed of an anhydrated component which dissolves slowly in water and a hydrated component which dissolves easily, the combined dissolution characteristics of the composition provide a well balanced prolonged sterilizing effect in its application for water treatment. Calcium hypochlorite compositions are formed in the tablet configuration by molding granular compositions with a molding press. The tablet is usually molded with higher pressures to take it resistant to breakage during shipment and dissolution, therefore, such tablet tends to become more slowly in its dissolution in water. Accordingly, the tablet having a good dissolution property and being strong enough to withstand breakage during the shipment is desired.

Since the calcium hypochlorite composition of the invention contains a hydrated composition which can be molded firmly with a high pressure molding into tablets without reducing the dissolution property, the calcium hypochlorite composition of the present invention provides a tablet which is not only safe in manufacturing and in handling and stable but also resistant to breakage with controlled dissolution characteristics.

The following examples may serve further to explain the invention, but are not to be construed as imposing any limitations thereon.

EXAMPLE 1

30 kg of a hydrated granular calcium hypochlorite composition having 64.7% of available chlorine content and crystallization water corresponding to 2 moles per mole of $Ca(OCl)_2$, and 18 kg of an anhydrated granular calcium hypochlorite composition having 71.3% of available chlorine content and 0.9% of crystallization water content were mixed intimately with a ribbon blender to obtain 48 kg of a granular heterogeneous calcium hypochlorite composition having 67.1% of available chlorine content. The composition did not decompose by a lit match. The obtained composition was stored under the conditions of 1 year at ambient temperatures, 200 days at 30° C. and 50 days at 40° C., and rates of loss of the available chlorine content during the storage were measured to result 4.4, 10.8 and 7.2% respectively.

EXAMPLE 2

20 kg of a hydrated granular calcium hypochlorite composition having 58.1% of available chlorine content and crystallization water corresponding to 3 moles per mole of $Ca(OCl)_2$, and 30 kg of an anhydrated granular calcium hypochlorite composition having 71.7% of available chlorine content and 1.2% of crystallization water content were mixed to obtain 50 kg of a granular heterogeneous calcium hypochlorite composition having 66.3% of available chlorine content. The composition did not decompose by a lit match. The rates of loss of the available chlorine content of the obtained composition measured after storage conditions of 1 year at ambient temperatures, 200 days at 30° C. and 50 days at 40° C. were 4.5, 10.5 and 7.0% respectively.

EXAMPLE 3

A hydrated granular calcium hypochlorite composition having 55.3% of available chlorine content and crystallization water corresponding to 2.9 moles per mole of $Ca(OCl)_2$ were mixed with 1 part by weight of an anhydrated granular calcium hypochlorite composition having 73.5% of available chlorine content and 0.4% of crystallization water content to obtain the following granular heterogeneous calcium hypochlorite compositions.
Composition
(A): 0.3 parts of the hydrated component was mixed. Available chlorine content was 69.3%.
(B): 0.5 parts of the hydrated component was mixed. Available chlorine content was 67.4%.
(C): 0 (The anhydrated component itself)

The compositions were compression molded with a molding press to obtain tablets of about 30 mm in diameter, 15 mm in high and 20 g in weight. The compression hardness of the tablets measured with a uniaxial compression tester were 120 kg on the avarage for tablets.

Each of the tablet was dissolved in 3l of water maintained at 30° C. under agitation of 60 RPM to measure the time necessary for complete dissolution of the tablet. The result is as follows:
Tablet from Composition
(A): 140 min.
(B): 120
(C): 190

The tablets were subjected to a safety test of an ignition with 2 drops of glycerine dropped on the tablets at 50° C. Result of the safety test is as follows:
Tablet from Composition
(A): Decomposed after 20 seconds and propagated slowly, but stopped shortly. (No decomposition when tested at ambient temperatures)
(B): No decomposition
(C): Decomposed after 15 seconds with flash, and the decomposition spread wholly.

Test 1

A hydrated calcium hypochlorite composition having 75% of available chlorine on a basis of the anhydrated state was anhydrated by contacting it with hot dry air to prepare specimens of granular calcium hypochlorite compositions which differed in their crystallization water contents in the range of from about 22 to about 1%. These specimens were stored under different conditions, and the relationship between the rate of loss of available chlorine content and the water content of the composition was checked.

Figure 1:
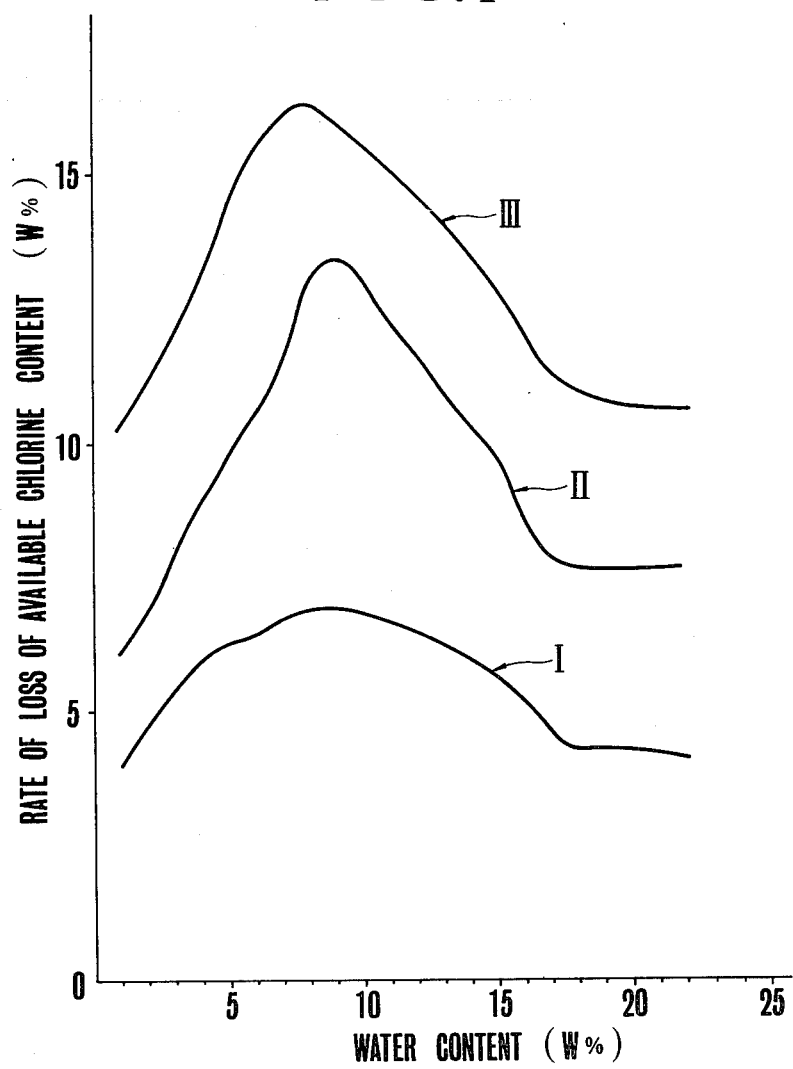
FIG. 1 shows a relationship between the water content of calcium hypochlorite compositions and the corresponding rate of loss of available chlorine contents when the compositions were storaged under different conditions.

The result indicating a striking effect of crystallization water content on stability of calcium hypochlorite composition is as shown in FIG. 1, where the storage conditions were as follows;
I. Ambient temperatures for 1 year,
II. 40° C. for 50 days, and
III. 30° C. for 200 days Test 2

A hydrated granular calcium hypochlorite composition having 60.4% of available chlorine content and crystallization water corresponding to 3 moles per mole of $Ca(OCl)_2$ was employed as an example of the hydrated component.

Various parts by weight of the hydrated component was mixed with 1 part of an anhydrated granular calcium hypochlorite composition having 76.5% of available chlorine and 0.4% of crystallization water content. Specimens of the mixture were subjected to safety tests of calcium hypochlorite compositions, and the result is as mentioned below:

| Parts of the hydrated component | Ignition test with match* | Ignition test with glycerine** |
|---|---|---|
| 0 | Self-propagating decomposition of 24 cm/min speed. | Decomposed after 3 seconds and propagated at 21 cm/min speed. |
| 0.1 | Self-propagating decomposition of 10 cm/min speed. | Decomposed after 7 seconds and propagated at 9 cm/min speed. |
| 0.2 | Self-propagating decomposition of 6 cm/min speed. | At the drop point, decomposition continued for 5 seconds. |
| 0.3 | No decomposition | No decomposition |

*about 100 g of a specimen was placed on a U-type iron trough of 50 cm length and 10 cm width. The specimen was lit with a match at the end.
**Two drops of glycerine were dropped at end of the specimen placed in the same way as the above test.

Further, a hydrated granular calcium hypochlorite composition having 57.5% of available chlorine content and crystallization water corresponding to 2.2 moles per mole of $Ca(OCl)_2$ was employed as an example of the hydrated component. The hydrated component was mixed with an anhydrated granular calcium hypochlorite composition having 73.4% of available chlorine and 0.6% of crystallization water content in varied proportions per 1 part of the anhydrated component. Specimens of the mixture were subjected to the same safety test as the above.

The test resulted in a mixture composed of 0.7 parts or more of the hydrated component and 1 part of the anhydrated component showed no decomposition.

Test 3

Following 4 specimens of calcium hypochlorite composition were employed to check a transfer of water between the hydrated component and the anhydrated component.

| Calcium hypochlorite composition | Available chlorine content | Crystallization water condition | Range of particle size |
|---|---|---|---|
| (A) | 60.1% | 2.9 moles* | 14 – 20 mesh |
| (B) | " | " | 20 – 42 |
| (C) | 73.5 | 1.0%** | 14– 20 |
| (D) | " | " | 20– 42 |

*Corresponding crystallization water, moles per mole of $Ca(OCl)_2$
**Crystallization water content Equal amount of (A) and (D) or (B) and (C) were mixed, and the mixture was storaged at 30° C. for a length of time. After the storage, the mixtures were sieved with a 20 mesh sieve to obtain the components as the retained and the passed, which corresponded to (A) or (C) and (B) or (D) respectively. Crystallization water condition of each component was as mentioned below:

| | Water condition of mesh passed particles | Water condition of 20 mesh retained particles |
|---|---|---|
| Mixture of (A) and (D): | | |
| After 30 days | 0.8% | 2.87 moles |
| After 60 days | 1.0 | 2.88 |
| After 90 days | 1.0 | 2.87 |
| Mixture of (B) and (C): | | |
| After 30 days | 2.88 moles | 1.0% |
| After 60 days | 2.9 | 1.0 |
| After 90 days | 2.88 | 0.9 |

We claim:
1. A heterogenous mixture of at least 0.3 parts by weight of (A) and 1 part by weight of (B), which comprises a stable, safe, granular calcium hypochlorite composition containing at least about 55% of available chlorine; where
   (A) is a hydrated calcium hypochlorite composition containing more than about 50% of available chlorine and keeping an amount of crystallization water corresponding to from 2 to 3 moles per mole of $Ca(OCl)_2$ in the form of $Ca(OCl)_2.3H_2O$, and
   (B) is an anhydrated calcium hypochlorite composition containing about 65% or more of available chlorine and less than 2% of crystallization water.

2. The composition according to claim 1 wherein the amount of crystallization water kept in a hydrated calcium hypochlorite composition corresponds to from 2.5 to 3.0 moles per mole of $Ca(OCl)_2$.

3. The composition according to claim 1 wherein the amount of crystallization water kept in a hydrated calcium hypochlorite composition corresponds to from 2.8 to 3.0 moles per mole of $Ca(OCl)_2$.

4. The composition according to claim 1, the active ingredient of a hydrated calcium hypochlorite composition is substantially $Ca(OCl)_2.3H_2O$.

5. A stable, safe, break-resistant, good-dissolubable calcium hypochlorite composition tablet containing at least about 55% of available chlorine which is prepared by compression molding of a heterogeneous mixture of at least 0.3 parts by weight of (A) and 1 part by weight of (B), where
   (A): a hydrated calcium hypochlorite composition containing more than about 50% of available chlorine and keeping an amount of crystallization water corresponding to from 2 to 3 moles per mole of $Ca(OCl)_2$ in the form of $Ca(OCl)_2.3H_2O$, and
   (B): an anhydrated calcium hypochlorite composition containing about 65% or more of available chlorine and less than 2% of crystallization water.

6. The composition according to claim 5 wherein the amount of crystallization water kept in a hydrated calcium hypochlorite composition corresponds to from 2.5 to 3.0 moles per mole of $Ca(OCl)_2$.

7. The composition according to claim 5 wherein the amount of crystallization water kept in a hydrated calcium hypochlorite composition corresponds to from 2.8 to 3.0 moles per mole of $Ca(OCl)_2$.

8. The composition according to claim 5, the active ingredient of a hydrated calcium hypochlorite composition is substantially $Ca(OCl)_2.3H_2O$.